(12) United States Patent  
Sohara

(10) Patent No.: US 7,247,963 B2  
(45) Date of Patent: Jul. 24, 2007

(54) ECCENTRIC ROTOR AND VIBRATION MOTOR USING SUCH ECCENTRIC ROTOR

(75) Inventor: Katsuhito Sohara, Isesaki (JP)

(73) Assignee: Tokyo Parts Industrial Co., Ltd., Gunma-ken (JP)

( * ) Notice: Subject to any disclaimer, the term of this patent is extended or adjusted under 35 U.S.C. 154(b) by 283 days.

(21) Appl. No.: 10/990,188

(22) Filed: Nov. 16, 2004

(65) Prior Publication Data

US 2005/0140222 A1 Jun. 30, 2005

(30) Foreign Application Priority Data

Dec. 26, 2003 (JP) ............................. 2003-431668  
Dec. 26, 2003 (JP) ............................. 2003-431710  
Jan. 29, 2004 (JP) ............................. 2004-020713

(51) Int. Cl.  
*H02K 7/065* (2006.01)  
*H02K 7/075* (2006.01)

(52) U.S. Cl. ...................................................... 310/81

(58) Field of Classification Search ................... 310/81, 310/237  
See application file for complete search history.

(56) References Cited

U.S. PATENT DOCUMENTS 5,471,103 A * 11/1995 Fujii ............................ 310/81  
5,942,833 A * 8/1999 Yamaguchi .................. 310/268  
6,246,143 B1 * 6/2001 Yamaguchi .................. 310/233  
6,534,886 B2 * 3/2003 An et al. ....................... 310/81  
6,621,188 B2 * 9/2003 An et al. ....................... 310/81  
6,674,202 B2 * 1/2004 Yamaguchi .................. 310/128  
6,713,911 B2 * 3/2004 Yamaguchi .................. 310/81  
6,765,331 B2 * 7/2004 Koyanagi et al. ........... 310/268  
6,828,705 B1 * 12/2004 Choi et al. ..................... 310/81  
6,909,206 B2 * 6/2005 Koyanagi et al. ............. 310/43  
7,049,721 B2 * 5/2006 Yamaguchi et al. .......... 310/81  
2005/0140222 A1 * 6/2005 Sohara .......................... 310/81

FOREIGN PATENT DOCUMENTS

JP 2002-28570 1/2002  
JP 2003-018814 1/2002  
JP 2002-119915 4/2002

* cited by examiner

*Primary Examiner*—Karl Tamai  
(74) *Attorney, Agent, or Firm*—Jordan and Hamburg LLP

(57) ABSTRACT

Because the bearing of an eccentric rotor is small, when it is integrated in a rotor by resin molding, the bearing unit can be fractured by impacts unless it has a sufficient mounting strength. Accordingly, an eccentric rotor is provided in which a sufficient mounting strength of the bearing on the rotor is ensured and the bearing unit is prevented from fracture by impacts. Also a vibration motor using the eccentric rotor is provided. The eccentric rotor includes a printed wiring board, a cylindrical bearing for insertion of a shaft, and a weight which are integrated to have a flat disk shape by resin molding. A shaft insertion hole has a diameter larger than the outer diameter of the shaft and smaller than the outer diameter of the bearing, and the bearing is integrated by resin molding in a state in which the entire periphery at the end portion thereof is disposed in contact with the printed wiring board around the insertion hole.

4 Claims, 6 Drawing Sheets

ECCENTRIC ROTOR AND VIBRATION MOTOR USING SUCH ECCENTRIC ROTOR

BACKGROUND OF THE INVENTION

The present invention relates to a miniature vibration motor employed to inform a user of a portable communication terminal device, such as a cellular phone, by vibrations that a signal has been received.

Vibration motors are installed at portable communication terminal devices, such as cellular phones, in order to inform a user by vibrations of the device that a signal has arrived.

Cylindrical vibration motors which have a cylindrical housing and a weight fixed to an output shaft protruding to the outside of the housing and flat vibration motors which have a coin-like housing and a shaft fixed to the housing, wherein an eccentric rotor is provided inside the housing, are the main types of vibration motors.

The rotor in flat vibration motors is eccentric by itself and is rotatably supported on the shaft fixed to the housing. For this reason a configuration is used in which a bearing, a weight and a coil are integrated together with a printed wiring board constituting a commutator substrate in a resin.

For example, Japanese Patent Application Laid-open No. 2002-119915 discloses a configuration in which a bearing is formed by a molded resin constituting the rotor and a configuration in which a sintered oil-impregnated bearing is used as the bearing and supported with the molded resin.

Japanese Patent Application Laid-open No. 2002-28570 discloses a configuration in which a printed wiring board, a hollow commutator coil, a weight, and a bearing are integration molded at the same time by resin molding.

With all the configurations disclosed in those open publications, a flat eccentric rotor is formed by integrating a printed wiring board constituting a commutator substrate, a bearing, a weight, and a coil by resin molding, and they are typically manufactured by resin molding by an injection molding process.

In recent years miniaturization of vibration motors installed on the devices followed the advanced miniaturization of the devices. Bearings such as sintered oil-impregnated bearings are used in the motors so as to rotate the eccentric rotor smoothly despite the reduced size of the motor. Furthermore, because the prescribed vibration quantity has to be ensured despite the miniaturization of the motor, the surface area taken by the coil and the ratio of the weight and size is increased in relation to the size of the motor so as to increase the rotation speed and eccentricity.

In vibration motors, a weight is molded integrally with the rotor. Therefore, if the motor is subjected to an impact, for example, when the device falls, the effect of the impact on the rotor is larger than that in the usual motors because the mass of the motor is increased by the weight.

Because the bearing has a small shape, when it is integrated in a rotor by resin molding, the bearing unit can be fractured by the impact unless a sufficient mounting strength is provided.

SUMMARY OF THE INVENTION

It is an object of the invention of the present application to provide an eccentric rotor in which a sufficient mounting strength of the bearing on the rotor is ensured and the bearing unit is prevented from fracture by impacts, despite the fact that the ratio of the size of the coils and weight in the vibration motor is increased and the bearing has a small size, and also to provide a vibration motor using the eccentric rotor.

An eccentric rotor has a configuration in which a flat plate-like commutator substrate which has a plurality of commutator segments formed by printing on one surface, a plurality of wound hollow armature coils placed on the other surface, and a shaft insertion hole for inserting a shaft serving as a rotation center and a cylindrical bearing for inserting the shaft are integrated together with a weight to have a flat disk shape by resin molding. The shaft insertion hole is an opening with a diameter larger than the outer diameter of the shaft and smaller than the outer diameter of the bearing, and the entire periphery at one end portion of the bearing is disposed in contact with the commutator substrate around the insertion hole and integrated therewith.

Because the commutator substrate and the bearing are integrally molded with a resin in a state in which they are brought into contact with each other, the commutator substrate holds the bearing, and the bearing unit is prevented from damage such as separation of the resin and bearing, even if the rotor is subjected to impact.

Thus, a high mounting strength can be obtained by the combined action of the mounting strength of the bearing and resin, the printed wiring board and resin, and the printed wiring board and bearing.

Furthermore, the entire periphery at one end of the bearing is in contact with a printed pattern provided around the shaft insertion hole. If the pattern is formed by printing on the commutator substrate and the pattern and the bearing are thus brought into contact, then the commutator substrate and the bearing can be integrated with good stability, while being in contact with each other when the commutator substrate and bearing are installed in an injection molding die by using the elasticity corresponding to the thickness of the pattern.

Furthermore, the bearing can be formed as a cylinder having a step, and this step is disposed in contact with the periphery of the shaft insertion hole and integrated therewith. If the bearing is thus provided with a step, the effective length of the bearing can be increased.

A vibration motor using such a rotor has a configuration comprises a housing composed of a case and a bracket, a shaft fixed to the housing, a magnet mounted on the housing, a terminal for power supply from the outside of the housing, a brush electrically connected to the terminal, and the aforementioned eccentric rotor to which electric power is supplied from the brush, wherein a thrust support member capable of supporting the commutator substrate is provided at the side of the commutator substrate.

When the motor is subjected to impact, the thrust support located at the commutator substrate is always brought into contact with the commutator substrate, rather than with the bearing. The configuration in which the commutator substrate and the bearing are integrally molded with the resin in a state in which they are in direct contact with each other is thus effective.

With the configuration of the eccentric rotor of the invention of the present application placing the entire periphery of the cylindrical bearing end portion in contact with the commutator substrate constituting the commutator substrate increases the mounting strength of the bearing on the rotor and makes it possible to obtain a rotor with excellent impact resistance in which the mounting portion of the bearing is not fractured even when an excess load is applied to the rotor by impact.

Furthermore, a motor incorporating the rotor also can have a high resistance to impact.

In addition, providing a pattern on the substrate surface which is in contact with the bearing end portion makes it possible to increase the tightness of the contact between the substrate and the bearing end portion, to bring the bearing and commutator substrate in contact with good stability, and to prevent the resin from penetrating into the shaft insertion hole or bearing. Thus, stable resin molding can be achieved. As a result, the mounting strength of the bearing on the rotor can also be stabilized.

BRIEF DESCRIPTION OF THE DRAWINGS

FIG. 1b is a sectional view thereof, taken along the line A-A in FIG. 1a.

FIG. 2 is a plan view of the printed wiring board of the eccentric rotor shown in FIG. 1a.

FIG. 3b is a sectional view thereof taken along the line B-B in FIG. 3a.

FIG. 5a is an enlarged view of a different embodiment of the bearing portion corresponding to the A-A section of the rotor shown in FIG. 1a.

DESCRIPTION OF THE PREFERRED EMBODIMENTS

Figure 1A:
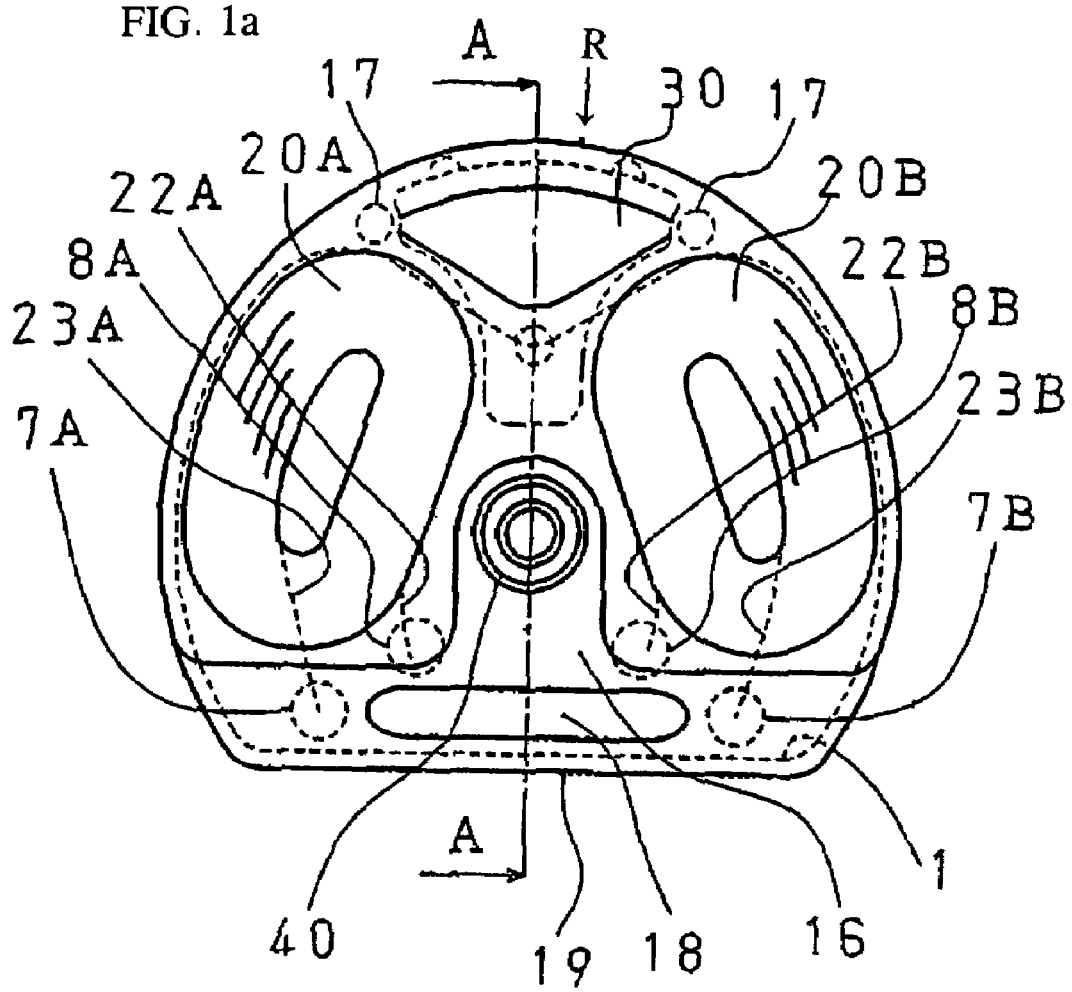
FIG. 1a shows a plan view of one embodiment of present an eccentric rotor of the invention of the present application.

A rotor R used in a vibration motor M (e.g. FIG. 4) comprises a thin printed wiring board 1 which is a so-called glass epoxy substrate or flexible substrate serving as a commutator substrate, wound hollow armature coils (referred to hereinbelow as "coils") 20A, 20B with an effective conductor opening angle of 40-90 degrees which are placed on the printed wiring board, a weight 30 provided to cause the eccentricity of the center of gravity of the rotor R, and a sintered oil-impregnated bearing (referred to hereinafter as "bearing") 40, these components being formed by resin molding, such as injection molding, to have a D-like plate shape.

The printed wiring board 1 is composed of coil carrying surfaces 3A, 3B onto which the coils are placed, terminal connection portions 4A, 4B, a central portion 5 which carries the bearing 40, and a retaining portion 6 for retaining directly or indirectly a retention protrusion 31 of the weight 30.

The terminal connection portions 4A, 4B are the regions where terminal connection patterns 7A, 8A, 7B, 8B are placed, these patterns serving for connecting the terminals 22A, 23A, 22B, 23B of the coils to corresponding segments 2.

The weight 30 has a thickness such that the weight is exposed at both surfaces of the plane of rotor R in order to maximize the weight thereof and is disposed between the two coils. The weight 30 has a portion which maintains strength with respect to the resin and is embedded in the resin so as to be fixed therein. For example, the weight is embedded by the chamfer 32 of the external portion 37 at the outer peripheral side of the rotor R, by the chamfer 33 at the inner peripheral side, and by the retention protrusion 31 which is thinner than the rotor R in the resin portion 15.

Guiding recesses 34, 35, 36 serving as positioning portions for positioning the rotor when it is resin molded are formed on portions of the weight 30 which are to be embedded in the resin.

The bearing 40 is formed from a sintered oil-impregnated metal so as to have a cylindrical shape. It is usually chamfered at both end portions both on the outer periphery and the inner periphery. A shaft 11 fixed to the housing of the motor M is inserted in the bearing 40, and the rotor R is rotatably supported inside the motor M.

A shaft insertion hole 5a is formed in the central portion 5 of the printed wiring board 1 which carries the bearing 40. The diameter of this shaft insertion hole 5a is larger than that of the rotary shaft and smaller than the outer diameter of the bearing 40. The position thereof is such that the resin is not exposed from the insertion hole 5a and that the end portion of the bearing 40 is in contact with the central portion 5.

The rotor R is, for example, formed from a thermoplastic resin such as a polyester, but it is typical for resin molding that shrinking or warping occurs in the portions with a large thickness. For this reason, a wall 16 in the outer peripheral portion at the D cut side of the resin portion 15 is formed with a recess 18.

Embodiment 1 of the present invention will be described hereinafter with reference to FIGS. 1 through 4.

In a rotor R, a printed wiring board 1, two coils 20A, 20B disposed on the printed wiring board 1, a weight 30, and a bearing 40 are formed by resin molding such as injection molding to have a plate-like shape, and the rotor is formed to have a D-like outer shape outlined by the resin portion 15.

The D-like shape is selected to reduce the weight of the opposing sides sandwiching the rotary shaft of the weight 30 in order to increase the eccentricity for the vibration motor.

The weight is formed from a material with a high specific gravity such as a tungsten alloy, and the substrate may have a round shape provided that a sufficient weight effect is produced.

The coils 20A, 20B are the wound hollow coils having an effective conductor opening angle of 40° to 90°. Each of the coils has two terminals 22A, 23A and 22B, 23B. The coils 20A, 20B are arranged on the rotor R at an arrangement angle of about 140° for each coil. Such a coil arrangement, for example, makes it possible to obtain a configuration in which a plurality of coils 20A and coils 20B are stacked, to employ coils arranged in two locations, and to determine an appropriate effective conductor opening angle or arrangement angle. There also can be three coils arranged in three locations.

The resin portion 15 is formed to have a maximum thickness equal to the maximum thickness of the weight 30 and that of the printed wiring board 1, and coils 20A, 20B are placed thereon. As a result, the thickest portion 38 of the weight 30 is exposed at both surfaces of the rotor R, and the lower surface 1A of the printed wiring board 1 and the upper surface of the coils 20A, 20B are exposed from the rotor R. With such a configuration, the thickness of the rotor R can be minimized while effectively using each component. In particular, the eccentricity can be increased to the extent of the thickness of the printed wiring board.

A step 16 is so provided that an upper end portion 40B of the bearing 40 protrudes from the upper surface of the resin portion 15.

In the printer wiring board 1, the coil carrying portions 3A, 3B onto which the coils 20A, 20B are to be placed and the terminal connection portions 4A, 4B having formed therein (on the upper surface 1B thereof) the terminal connection patterns 7A, 8A, 7B, 8B for connecting the terminals 22A, 23A and 22B, 23B of the coils 20A, 20B are formed on the upper surface 1B of the board. A plurality of commutator segments 2 (six in the present embodiment) are formed by printing on the lower surface 1A of the printed wiring board 1.

The circuitry for connecting the patterns or commutator segments has no direct relation to the present invention, and an explanation thereof is omitted.

A shaft insertion hole 5a for inserting a shaft 11 is formed in the central portion 5 of the printed wiring board 1, and a cylindrical bearing 40 is disposed on the upper surface 1B. The opening diameter of the shaft insertion hole 5a is slightly larger than the diameter of the shaft 11 and smaller than the outer diameter of the bearing 40, thereby allowing for direct contact of the end portion 40A of the bearing 40 and the upper surface 1B of the printed wiring board 1.

The bearing 40 is made, for example, from a sintered oil-impregnated metal. The chamfered surfaces 41 are often formed by chamfering at both end portions 40A, 40B. The bearing 40 and printed wiring board 1 are brought into contact over the entire periphery of the cylindrical end portion at the end portion other than the chamfered surface 41.

If the bearing is thus placed on the printed wiring board and the rotor R is formed by resin molding, even when an impact in the direction of the shaft 11 acts upon the motor M, because the bearing is supported by the printed wiring board, the bearing and the resin portion 15 are not separated and a rotor R with a very high resistance to impact can be obtained.

When the printed wiring board 1 and bearing 40 are installed in an injection molding mold, the die is pressed against the end portion 40B of the bearing 40 and the lower surface 1A of the printed wiring board 1, but the tightness of contact between the end portion 40A and upper surface 1B has to be further increased to prevent the resin from penetrating into the shaft insertion hole 5a due to spread in the dimensions of the parts.

This is explained in greater detail with reference to FIG. 5a and FIG. 5b.

Figure 5A:
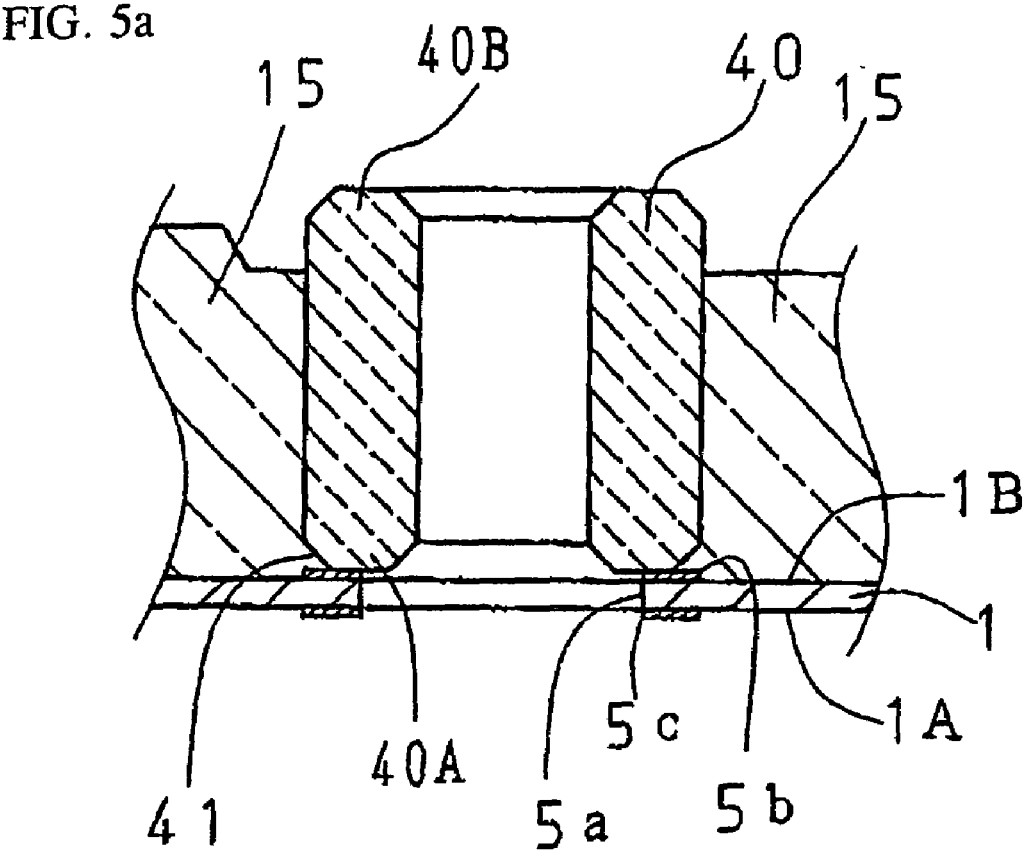

Referring to FIG. 5a a ring-like pattern 5b is formed by printing around the shaft insertion hole 5a on the upper surface 1B of the printed wiring board 1. Resin molding is conducted after positioning the bearing 40 so that the entire periphery of the end portion 40A thereof lays on top of a ring-like pattern 5b and placing the bearing on the printed wiring board 1. A ring-like pattern 5c is also formed around the shaft insertion hole 5a on the lower surface 1A of the printed wiring board 1. The ring-like patterns 5b, 5c may be made of copper, for example, a copper foil attached to a board of glass epoxy resin or paper epoxy resin. Instead of copper, aluminum may be used.

Once the printed wiring board 1 and bearing 40 have been installed in an injection molding mold, the die and the bearing 40, the bearing 40 and the printed wiring board 1, and the printed wiring board 1 and the die can be brought into intimate contact with each other by using the elasticity of the ring-like patterns 5b, 5c.

Figure 5B:
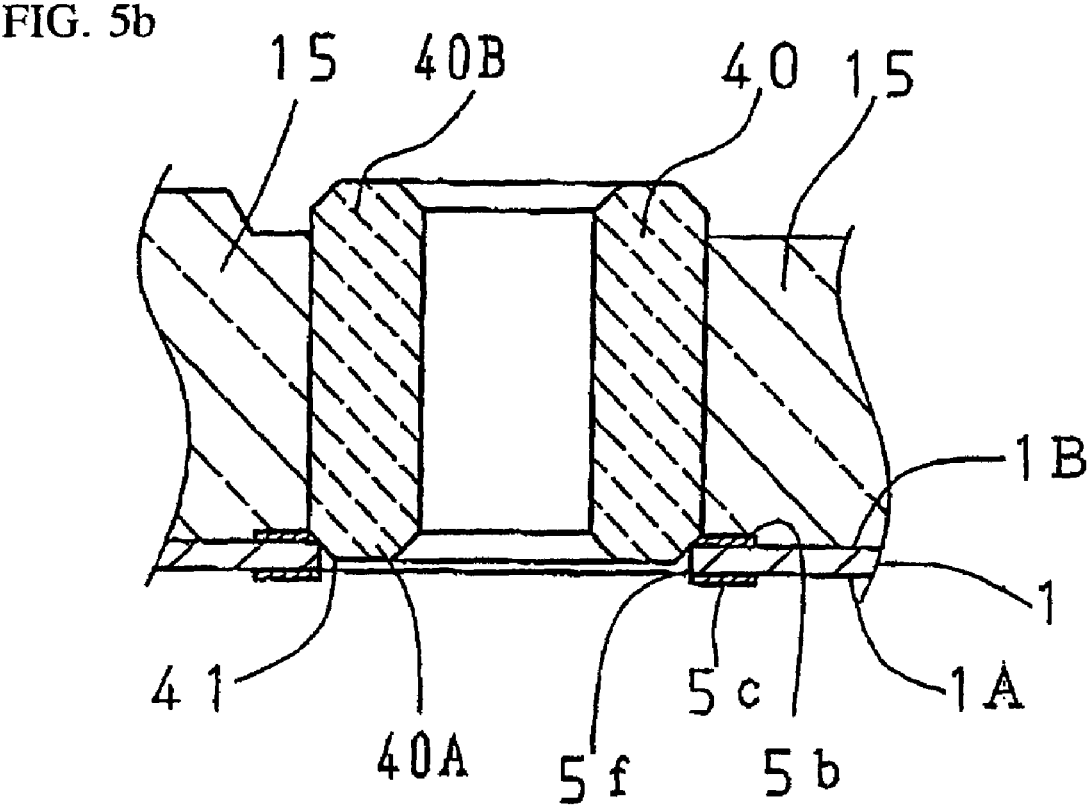
FIG. 5b is a view similar to FIG. 5a showing another embodiment.

FIG. 5b illustrates another embodiment of the relationship between the bearing and the shaft insertion hole. The end portion 40A of the bearing 40 does not protrude from the lower surface 1A of the printed wiring board 1 even though the chamfered surface 41 is in contact with the edge of the shaft insertion hole 5f, the molding resin is prevented from penetrating into the shaft insertion hole 5f and the bearing 40 and resin portion 15 do not protrude from the lower surface 1A of the printed wiring board 1.

In this case, the chamfered surface 41 is brought into contact so as to be attached under pressure to the inner peripheral portion of the ring-like pattern 5b. Due to the spread in the thickness of ring-like patterns 5b, 5c or dimensions of each member, the ring-like pattern 5c can be omitted. Furthermore, the shape of the ring-like pattern 5b is not limited to a ring-like shape, and any shape may be employed provided that it can be in contact with the end portion 40A of the bearing 40.

The coils 20A and 20B are arranged at an arrangement angle of about 140° on the rotor R, and the weight 30 for making the rotor R eccentric is disposed between the coils within the 140° angle. The weight 30 has a high specific gravity and is formed, for example, by sintering a tungsten alloy. The weight has a T-like shape and the external portion 37 thereof has a circular arc shape following the outer periphery of the rotor R. If the thickest portion 38 is made as thick as the rotor R so as to be exposed on both surfaces of the rotor R, a large eccentricity can be obtained. A recessed notched portion 9 is formed in the printed wiring board 1 so as to expose the thickest portion 38 of the weight.

Around the thickest portion 38, the chamfered surface 32 for embedding the weight 30 into the resin is formed as a circular arc along the outer periphery of the rotor R, and the chamfered surface 33 is also formed as a circular arc along the contours of coils 20A, 20B. Because of those chamfered surfaces, the resin readily flows around the weight 30 during molding, the weight 30 is embedded in the resin portion 15, and the weight 30 is strongly fixed with respect to the rotor R. A retention protrusion 31 is formed in the weight 30 along the direction of the shaft 11 continuously with the chamfered surface 33.

This retention protrusion 31 is embedded in the resin portion 15 and supported in the direction of the shaft 11 with a retention portion 6 formed in the printed wiring board 1. If the thickness of the retention protrusion 31 is decreased, the resin penetrates between the upper surface 1B of the printed wiring board 1 and the retention protrusion 31, and the weight 30 is fixed to the rotor R with good stability and supported indirectly in the thickness direction by the printed wiring board 1.

Guiding recesses 34, 35 for determining the position of the weight 30 during resin molding are formed in the portions where the chamfered surface 32 and chamfered surface 33 intersect in the external portions of the weight 30. When the weight 30 is installed in a molding die during resin molding, these guiding recesses 34, 35 are disposed to match the guiding pins mounted on the die.

The reduction in the eccentricity of the weight 30 can be avoided, if at all possible, by providing those guiding recesses 34, 35 in the portions of chamfered surfaces 32, 33, rather than forming the recesses in the thickest portion 38. Because the chamfered surfaces 32, 33 are provided so that the external portions of the weight 30 can be embedded in the resin, the shape thereof is not limited to that shown and the external portions may be formed continuously as concave portions. Furthermore, a plurality of guiding recesses 34, 35 may be provided in the chamfered surface 32 or chamfered surface 33, respectively, rather than in the intersection portion of chamfered surfaces 32, 33, provided that they do not hinder the flow of resin.

An opening 17 formed in the resin portion 15 is formed by the guide pin.

Figure 3A:
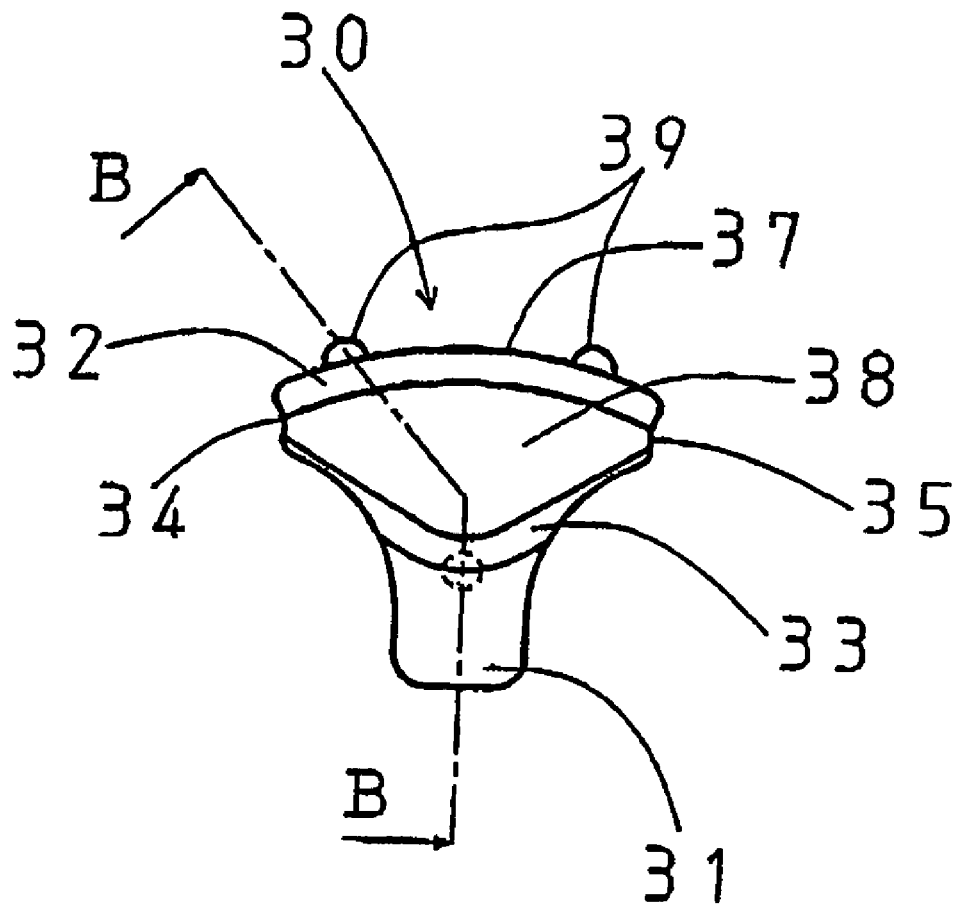
FIG. 3a shows a plan view of the weight in the eccentric rotor shown in FIG. 2.
Figure 3B:
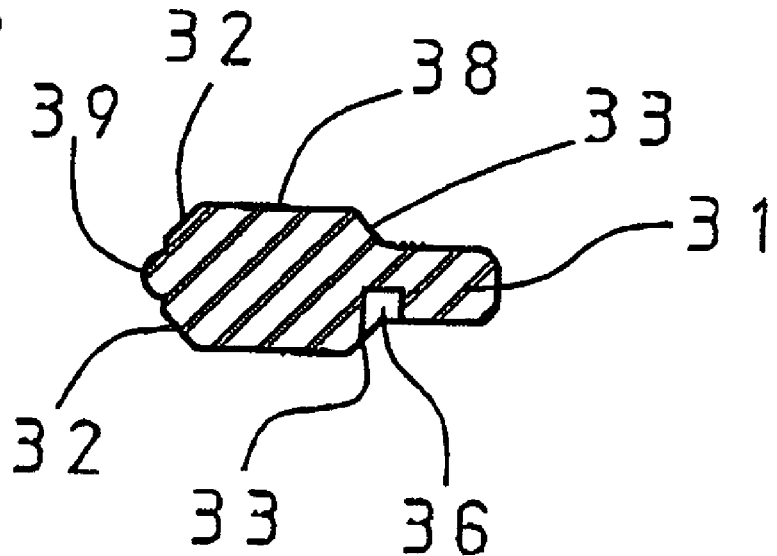

The guiding recesses may be also provided in the retention protrusion 31. For example, as shown in FIG. 3a and FIG. 3b, providing a recess 36 in the retention protrusion 31 does not decrease the eccentricity of the thickest portion 38. This recess 36 may be in the form of an opening passing in the thickness direction, and if an opening is provided in the position corresponding to the printed wiring board 1, as may be necessary, the positions with respect to the substrate can be matched simultaneously.

Two spherical protrusions 39 are formed outwardly of the rotor R in the external portion 37 of the weight 30. When the weight 30 is installed in a molding die, play is provided between the guide pin and the guiding recesses 34, 35 to facilitate the installation. If the external portion 37 is brought into contact with the inner wall surface of the die, because the weight 30 rattles due to this play, the flow of resin to the outer periphery of the weight 30 is degraded.

When the weight 30 rattles, the protrusion 39 beats against the inner wall surface of the die, thereby preventing the external part 37 from being in contact with the inner wall surface of the die, and the resin portion 15 can be formed because of good flow of the resin to the weight 30. The protrusion 39 is not limited to a spherical shape and may be of any shape, provided that the distal end side thereof is in contact with the die over a small surface area and does not hinder the resin flow.

In the above-described configuration, the thickest portion of the weight 30 is exposed on both surfaces of the rotor R. However, even when the entire weight 30 is placed on the upper surface 1B of the printed wiring board 1 and the thickest portion is provided on one side of the rotor, weight positioning can be conducted without sacrificing the eccentricity of the thickest portion of the weight, by providing a guiding recess or guiding opening in the zone of embedding in the resin and by forming a guide pin hole in the position corresponding to the printed wiring board.

Furthermore, because positioning of the weight 30 is conducted with a guide pin of the die, it is unnecessary to attach the weight 30 adhesively to the substrate and the number of operations can be reduced.

As described hereinabove, in the rotor R, the printed wiring board 1, coils 20A, 20B, weight 30, and bearing 40 are integrally molded from a resin, and the rotor is formed to have a plane D-like shape by the resin portion 15. Here, the coils 20A, 20B and weight 30 may be completely fit within a range of 180° about the shaft 11 as a reference, but this is often difficult due to the size of components.

In the present embodiment, too, parts of the coils 20A, 20B or the connection patterns 7A, 8A, 7B, 8B have to be disposed on the opposite side from the weight 30, that is, on the opposite side from the center of gravity, sandwiching the bearing 11. In this case, the weight of the portions on the opposite side from the center of gravity has to be reduced as much as possible.

Furthermore, in case of resin molding, shrinking or warping occurs if the thickness of the resin is large, Therefore, a small thickness is preferred.

The resin portion 15 formed in portions of the connection patterns 7A, 8A, 7B, 8B is required to have a certain thickness to allow for soldering of terminals 22, 23 and to cover the connection sections with the resin in order to prevent disconnection. For this purpose, a recess 18 is provided outside the connection patterns 7A, 8A, 7B, 8B and terminals 22A, 23A, 22B, 23B, in the thick part of the resin portion 15 on the opposite side from the center of gravity, the recess being such that a wall section 19 is on the outermost periphery.

The recess 18 reduces the weight on the opposite side from the center of gravity and prevents warping caused by the thickness. The wall section 19 provides for a sufficient strength of the outer peripheral portion and retains the flatness of the rotor R.

The shape of the recess can be appropriately determined according to the arrangement of connection patterns 7A, 8A, 7B, 8B and terminals 22A, 23A, 22B, 23B.

Figure 4:
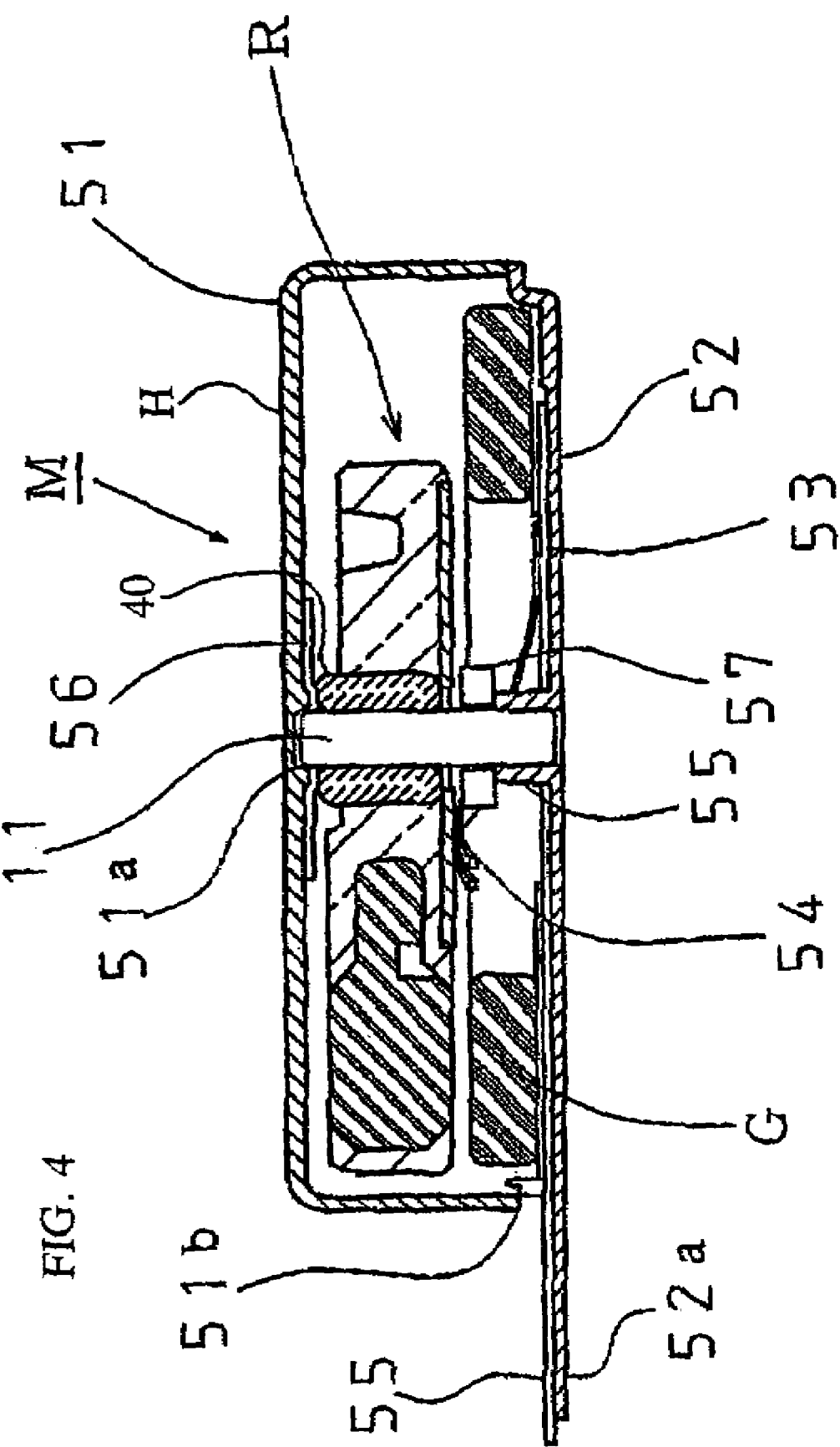
FIG. 4 is a cross-sectional view of the main components at the side surface of the vibration motor using the eccentric rotor of the invention of the present application.

FIG. 4 shows an example of a vibration motor using the above-described rotor.

In a motor M, a disk-like bracket 52 produced from a thin sheet of stainless steel is fixed to a case 51 in the form of a cylindrical cap made from a thin sheet of stainless steel, thereby forming a housing H. A shaft 11 is fixed to a bar ring 55 of the bracket 52, and a rotor R is rotatably supported on the shaft 11.

A brush base 53 for supplying electric power to the rotor with a brush 54 is mounted on the bracket 52. The brush base is formed from a printed wiring board in the form of a thin sheet such as a flexible substrate or a glass epoxy substrate.

Figure 1B:
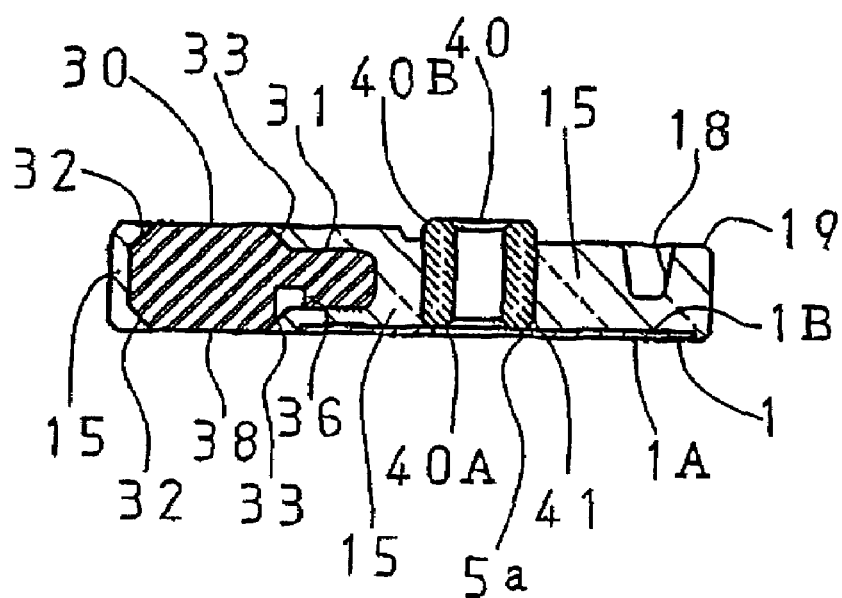
Figure 2:
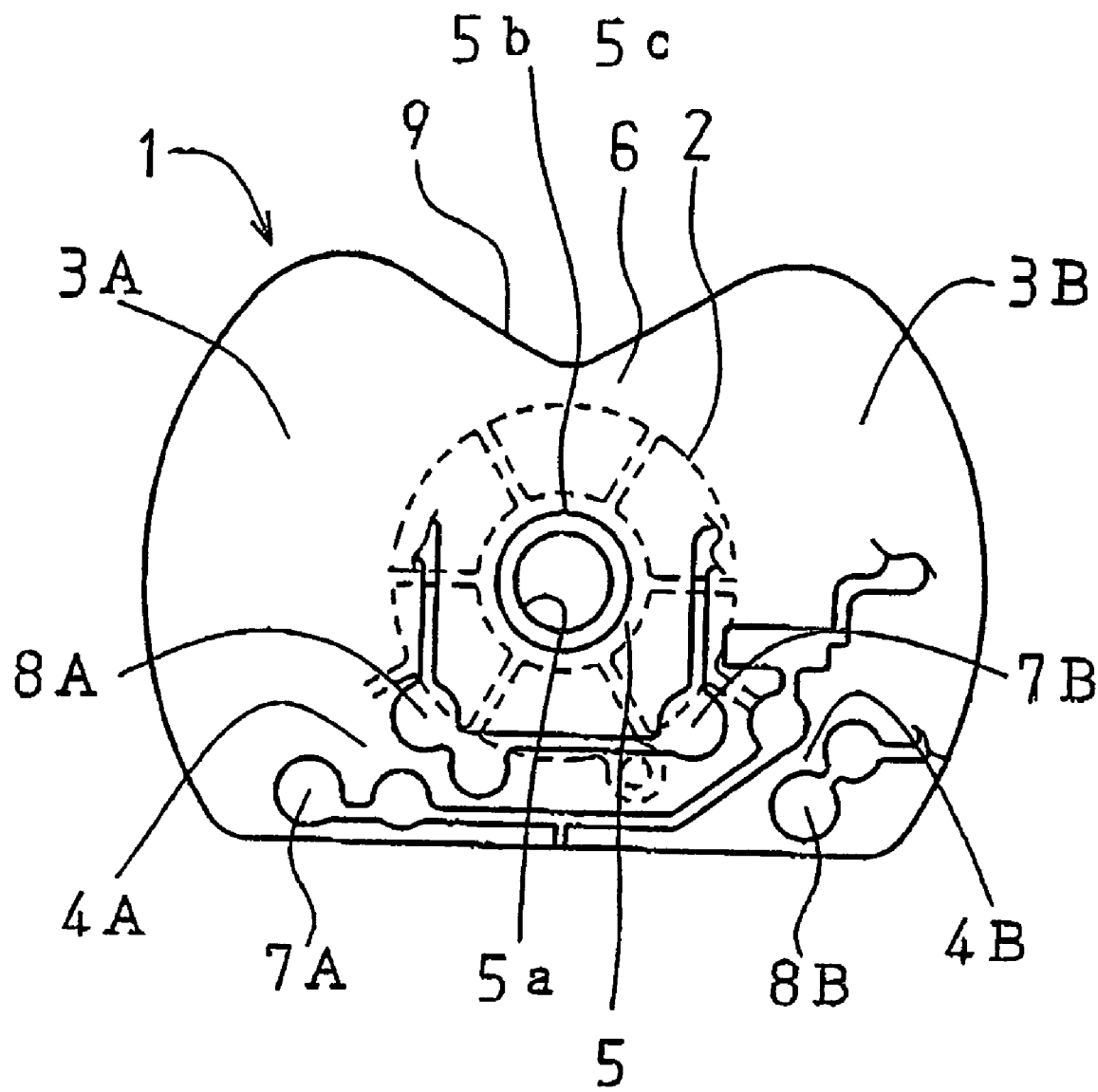

A pair of brushes 54 (only one of them is shown in FIG. 1) is provided around the shaft 11 from the brush base 53. One end of each brush is led out through an opening 51b to the outside of the housing H as a power supply terminal 52a. A terminal-carrying portion 52a for carrying a power supply terminal 55 is provided on the bracket 52. A free end of the brush 54 is in sliding contact with the commutator segments 2 of the rotor R.

A ring-like magnet G is mounted on the inner side surface of the bracket 52. The magnet G is an axial gap magnet with four magnetized poles in the circumferential direction. The magnet faces the rotor R.

The shaft 11 is press fitted and fixed at one end thereof to a bar ring 55 provided in the center of the bracket 52. The other end of the shaft is mounted on a recess 51a provided in the center of the housing, a sliding sheet 56 being therebetween. The rotor R is rotatably supported on the shaft 11 with a bearing 40.

The rotor R is constantly pressed against the case 51 with the brush 54. For this reason, at the upper surface side of the rotor R, the upper end portion of the bearing 40 is in direct contact with the sliding sheet 56, and at the lower surface side, the central portion 5 at the lower surface 1A of the printed wiring board faces a thrust support 57 formed from a washer with sliding property.

If the vibration motor is subjected to impacts in the direction of shaft 11, the rotor R moves in the axial direction. If it moves upward, the end portion 40B of the bearing 40 hits against the housing, and if the rotor moves downward, the lower surface 1A hits against the thrust support 57.

In both cases, because the bearing 40 and the printed wiring board 1 are in contact and integrated, the mounting strength of the bearing 40 on the rotor is high and fracture of the bearing part is prevented.

A variety of configurations can be considered for components other than the rotor R, for example, the housing H and brush base 53 that constitute the vibration motor M, and they should not be limited to the above-described embodiment. Thus, the configuration of the vibration motor using a mechanical commutator of a shaft fixing type that was disclosed in an earlier filed application can be used.

Figure 6:
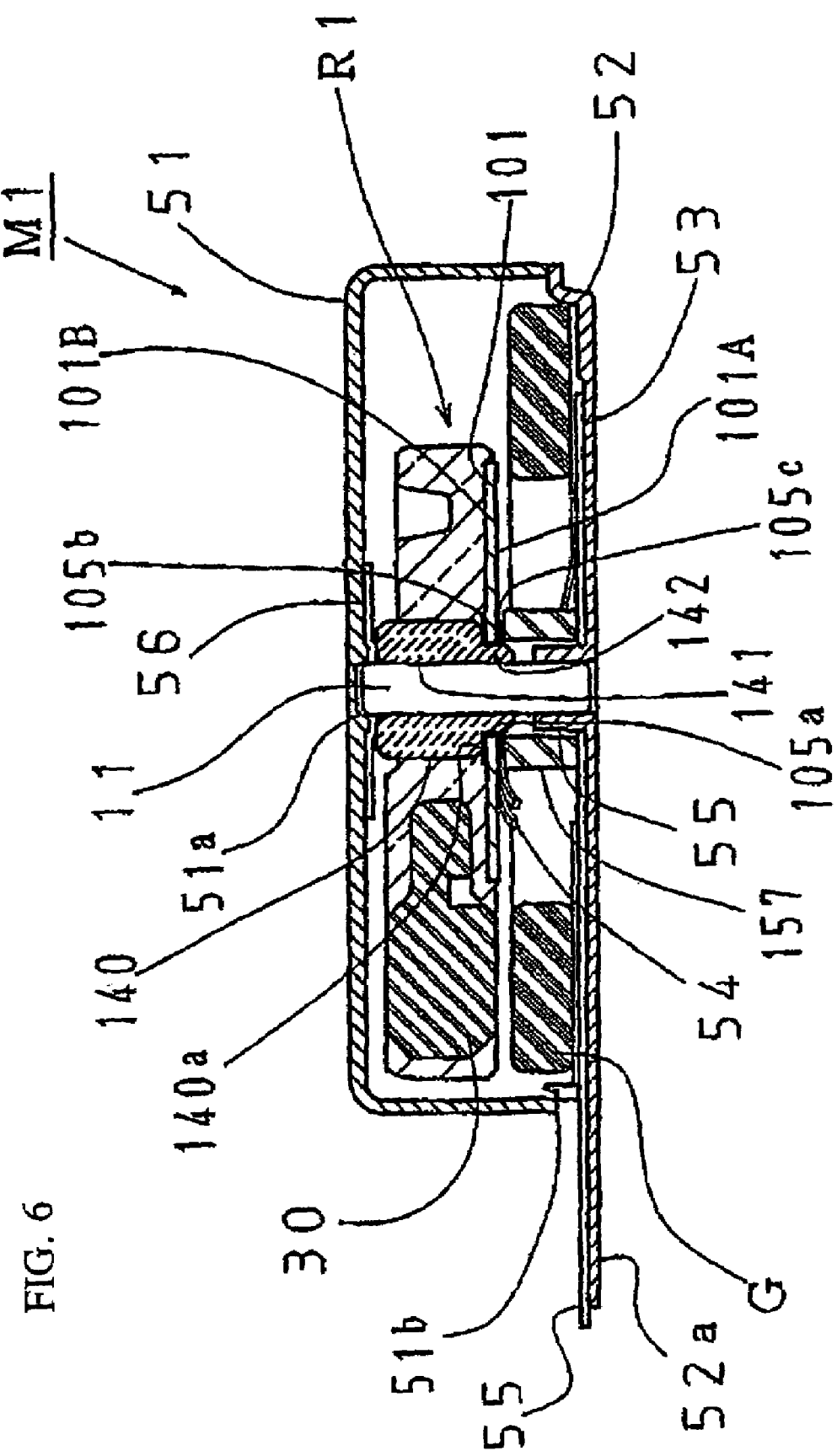
FIG. 6 is a cross-sectional view illustrating the main components at the side surface of the vibration motor using another rotor of the invention of the present application.

FIG. 6 shows a rotor R1 of another embodiment of the invention of the present application and a vibration motor M1 using this rotor R1.

Components identical to those of Embodiment 1 are assigned with identical symbols and the explanation thereof is herein omitted.

In the rotor R1, coils 20A, 20B are placed on a printed wiring board 101 and they are integrated together with a bearing 140 and a weight 30 by resin molding.

The bearing 140 has a cylindrical shape having a step 140a and is formed by a connecting large-diameter portion 141 and a small-diameter portion 142. A step 140a forms an end part of the large-diameter portion 141.

A shaft insertion hole 105a of the printed wiring board 101 is an opening with a diameter larger than that of the small-diameter portion 142 and less than that of the large-diameter portion 141, and the step 140a of the bearing 140 is placed on the upper surface 101B thereof.

The small-diameter portion 142 protrudes to the side of the lower surface 101A through the printed wiring board 101. Such a shape makes it possible to enlarge the effective length of the bearing.

Ring-like patterns 105b, 105c are formed by printing around the shaft insertion hole 105a, and the ring-like pattern 105b is formed so as to be in contact with the step 140a. The action thereof is similar to that of 5b, 5c, respectively.

A cylindrical spacer 157 is provided around the bar ring 55 to control the downward thrusting movement of the rotor R1. The inner diameter of the spacer 157 is such that the small-diameter portion 142 of the bearing 140 can be inserted into the spacer, and the bearing 140 and spacer 157 are prevented from being in direct contact with each other.

When the vibration motor M1 is subjected to impacts and the rotor R1 moves toward the spacer, the spacer 157 supports the lower surface 101A of the printed wiring board 101. This action is identical to that described in Embodiment 1.

| Legends | |
| --- | --- |
| R | rotor |
| 1 | printed wiring board |
| 5a, 5f | shaft insertion holes |
| 2, 20A, 20B | coils |
| 30 | weight |
| 40 | bearing |
| 40A | bearing end portion |

What is claimed is:

1. An eccentric rotor rotatable about a shaft comprising: a commutator substrate having a plurality of commutator segments, armature coils on said substrate, a bearing receiving said shaft and having at least one cylindrical section having an outer diameter, a weight, an integral resin molded structure which integrally molds together said substrate, said armature coils, said bearing and said weight, said rotor having a first outer side and a second outer side, said weight having a first outer face defining a part of said first outer side and a second outer face defining a part of said second outer side, said substrate having an outer surface substantially coplanar with said second outer face of said weight;

wherein said weight has an outer peripheral portion, said integral resin molded structure having an outer peripheral part disposed radially outwardly of said outer peripheral portion of said weight, said outer peripheral part having an outer circumferential surface extending in an axial direction of said eccentric rotor; and wherein said outer peripheral portion of said weight has at least one outer projection extending radially outward from said outer peripheral portion of said weight to said outer circumferential surface of said integral resin molded structure.

2. An eccentric rotor according to claim 1 wherein said weight has an outer radial section and an inner radial section, said first and second outer faces of said weight being formed on said outer radial section, said outer radial section having a first axial thickness defined by the axial distance between said first and second outer faces of said weight, said inner radial section of said weight having a second axial thickness less than said first axial thickness.

3. An eccentric rotor rotatable about a shaft comprising a commutator substrate having a plurality of commutator segments, armature coils on said substrate, a bearing receiving said shaft and having at least one cylindrical section having an outer diameter, a weight, an integral resin molded structure which integrally molds together said substrate, said armature coils, said bearing and said weight, said rotor having a first outer side and a second outer side, said weight having a first outer face defining a part of said first outer side and a second outer face defining a part of said second outer side, said substrate having an outer surface substantially coplanar with said second outer face of said weight;

wherein said weight has an outer radial section and an inner radial section, said first and second outer faces of said weight being formed on said outer radial section, said outer radial section having a first axial thickness defined by the axial distance between said first and second outer faces of said weight, said inner radial section or said weight having a second axial thickness less than said first axial thickness; and wherein said inner radial section has a first side and a second side, said resin molded structure comprising a first structure part on said first side of said inner radial section and a second structure part on said second side of said inner radial section.

4. An eccentric rotor according to claim 3 wherein said first structure part has a first outer surface, said second structure part having a second outer surface, said inner radial section having a third axial thickness defined by the axial distance between said first and second outer surfaces, said third axial thickness being equal to said first axial thickness.

* * * * *